Figure 1:
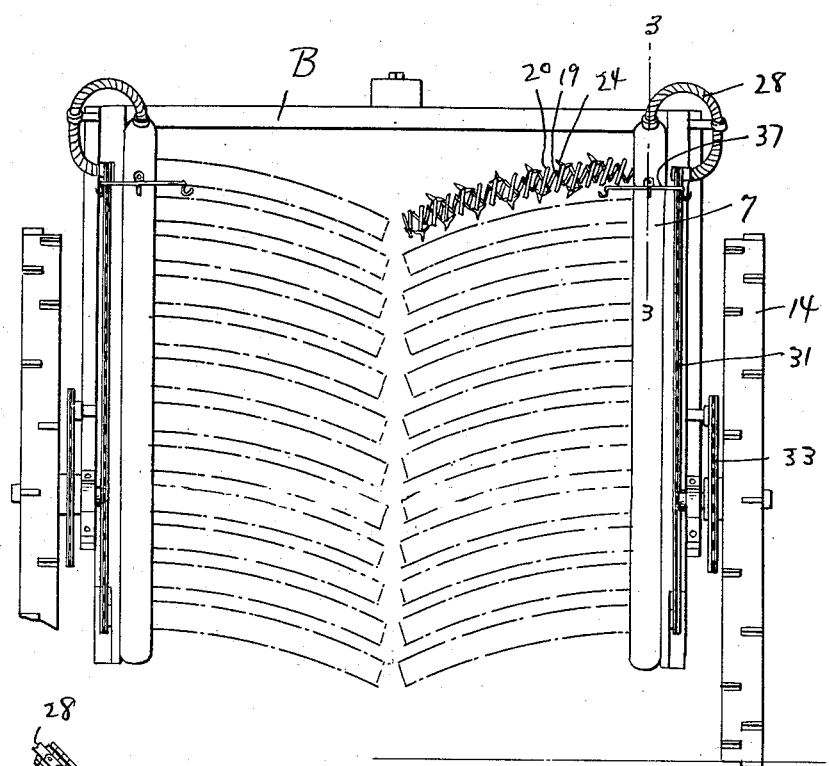

March 4, 1930.　　　J. DARBONNE, JR　　　1,749,468
COTTON HARVESTER AND PICKER
Filed March 1, 1928　　　3 Sheets-Sheet 1

Inventor
Joseph Darbonne Jr.

By Clarence A. O'Brien
Attorney

March 4, 1930.  J. DARBONNE, JR  1,749,468
COTTON HARVESTER AND PICKER
Filed March 1, 1928    3 Sheets-Sheet 2

Inventor
Joseph Darbonne Jr.

By Clarence A O'Brien
Attorney

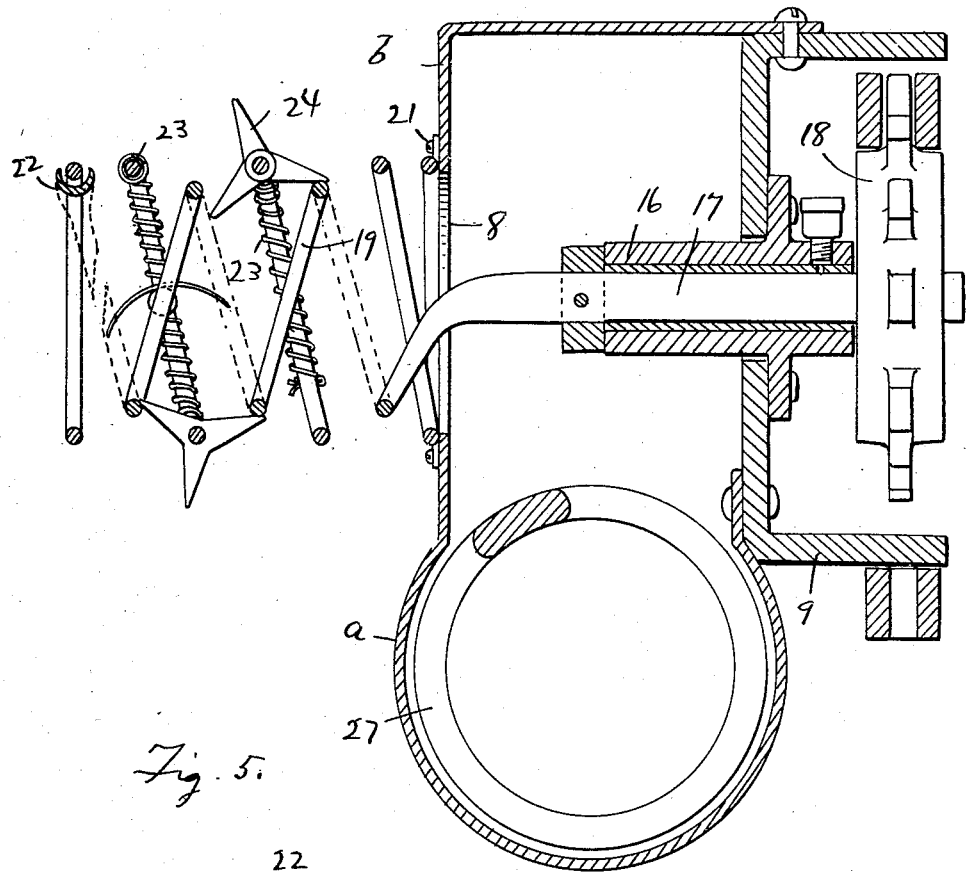
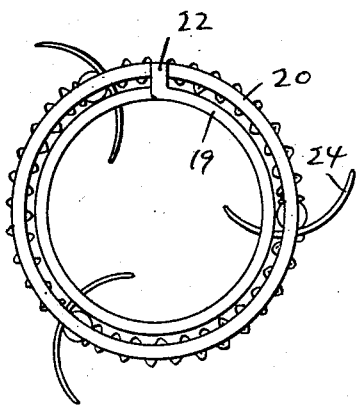
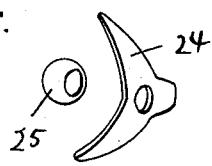

Patented Mar. 4, 1930

1,749,468

UNITED STATES PATENT OFFICE

JOSEPH DARBONNE, JR., OF ELTON, LOUISIANA

COTTON HARVESTER AND PICKER

Application filed March 1, 1928. Serial No. 258,328.

The present invention relates to a combined cotton picker and harvester and has for its prime object to provide a wheeled machine which may be pulled along a row of cotton plants and has means for stripping the cotton from the plant and delivering the cottom to bags or other like receptacles.

Another very important object of the invention resides in the provision of a machine of this nature utilizing a frame in the general formation of an arc having on the sides thereof picking and harvesting means, said picking means being of a resilient nature and efficient in stripping all of the cottom from the plant.

A still further very important object of the invention resides in the provision of a machine of this nature having a comparatively simple and inexpensive construction which is capable of operation very economically and is thoroughly efficient and reliable in its operation.

A further object of the invention resides in the provision of a machine of this nature wherein the parts are arranged in a compact and convenient manner for attaining the ends desired.

With the above and numerous other objects in view as will appear as the description proceeds, the invention resides in certain novel features of construction, and in the combination and arrangement of parts as will be hereinafter more fully described and claimed.

Figure 3:
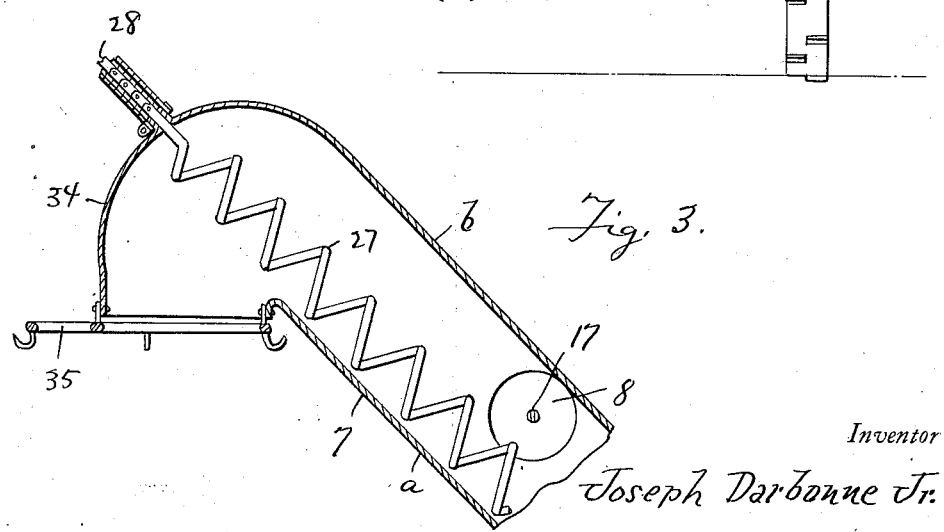
Figure 2:
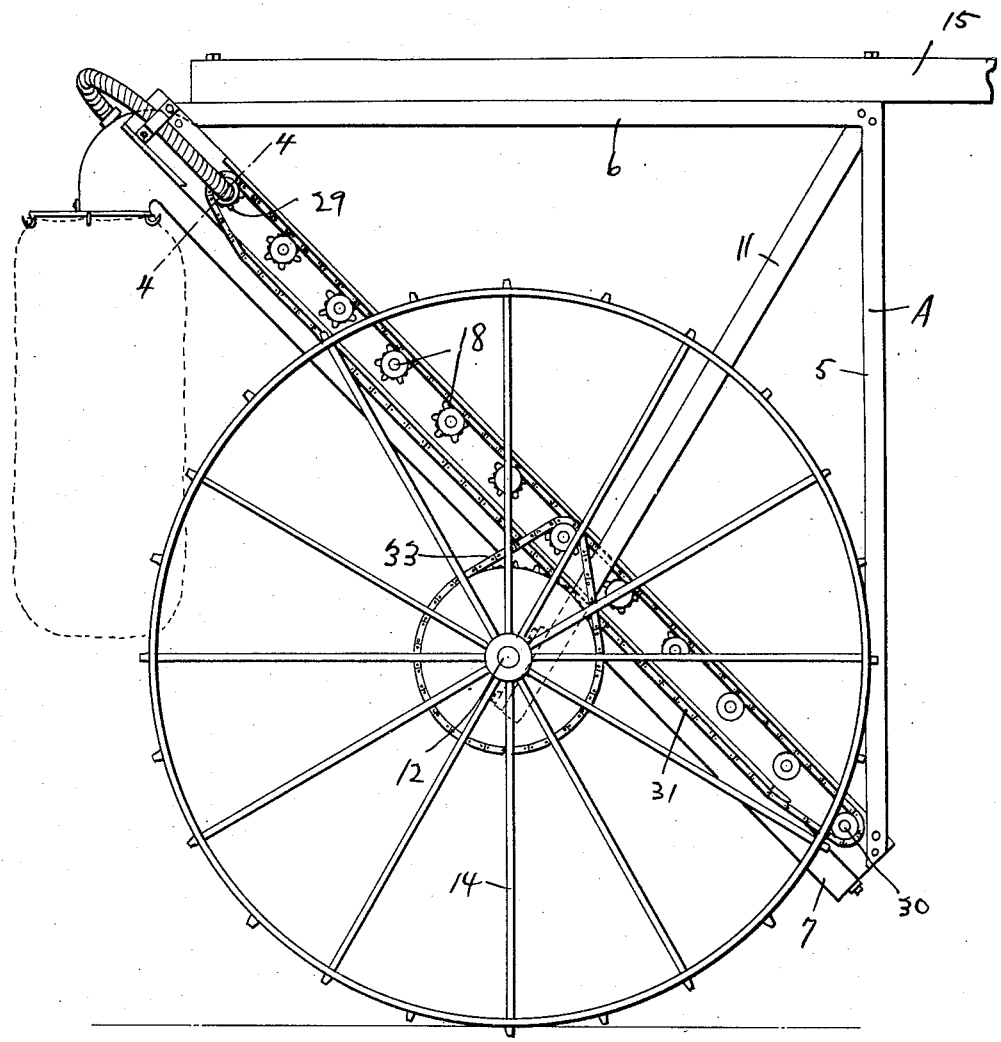

In the drawing,

Figure 1 is a fragmentary rear elevation of the machine embodying the features of my invention, Figure 2 is a side elevation thereof, Figure 3 is an enlarged transverse vertical section through the upper portion of one of the tubes showing one of the coils, Figure 4 is a vertical fragmentary longitudinal section through one of the tubes, Figure 5 is an end view of one of the pickers, and Figure 6 is a perspective view of one of the rotating conveying elements forming part of one of the pickers.

Referring to the drawing in detail it will be seen that the frame comprises side members A connected by cross members B. Each side member comprises a front leg 5 and a top leg 6 disposed at right angles thereto. The legs 5 and 6 are secured to the bottom and upper ends of tubes 7. These tubes may have any suitable shape but are preferably shaped in section such as is shown in Figure 3 so as to provide a cylindrical trough bottom $a$ with upper casing like portion $b$, the latter being provided with transverse openings 8. The casing portion $b$ of the tube 7 is secured to channel bars 9 and these channel bars are the portions of the casing which are secured to the legs 5 and 6 thereby retaining their rigidity and strength. Braces 11 extend from the junctures of the legs 5 and 6 downwardly and rearwardly and have bearings on their lower ends for rotatably receiving an axle shaft 12 on the ends of which is fixed a pair of wheels 14. A means 15 may lead to any suitable draft means.

A plurality of bearings 16 are extended through openings in the bars 9 in registry and coaxial alinement with openings 8 and rotatably receive shafts 17 having sprockets 18 on their outer ends and having their inner ends extending through the openings 8 and merging into resilient coils 19. Resilient coils 20 of greater diameter than coils 19 are disposed about the coils 19 and are fixed to the casing portions $b$ as is indicated at 21. The outer ends of the coils 19 terminate in yokes 22 for receiving the outermost coil of the coils 20 functioning as a guide. Coil springs 23 are wrapped about the coils 20 and hold at various intervals star wheels 24 which are rotatable on the coils 20. The springs impinge against balls 25 provided on the coils 20 as is indicated in Figure 4. The ends of the star wheels extend between the coils of the coils 19. These star wheels 24 are curved as indicated to advantage in Figures 4 and 5, and are disposed at intervals of one hundred and twenty degrees to the coils 20. When the sprocket wheels 18 are rotated for rotating the coils 19 the cotton which engages between the coils will be drawn between the coils of the coils 20 and stripped from the plant and the rotation of the coils 19 causes the rotation of the star wheels 24 which assist in urging the cotton through the coils and through the opening 8. The springs 23 not only function to hold the star wheels in place but prevent the coils 19 from sagging between the convolutes of the coils 20 and minimize the friction between the two coils.

These pickers including the coils 19 and 20 extend inwardly from the tube as indicated to advantage in Figure 1 there being a sufficient number of them to reach from the ground to the upper portion of the machine so that the cotton may be taken from all points of the cotton plant. The machine is run along so that the frame straddles the row of cotton. In the trough bottoms *a* coils 27 are mounted for rotation therein being actuated by flexible shafting 28 from sprockets 29. Sprockets 29 are mounted adjacent the upper portions of the bars 9. Other sprockets 30 are mounted adjacent the lower portions thereof. Chains 31 are trained over the sprockets 29, 30 and 18 as is clearly illustrated in Figure 2. This chain and sprocket mechanism is driven by other chain and sprocket mechanisms 33 from the wheels 14. The upper ends of the tubes terminate in downwardly directed portions 34 as is illustrated in Figure 3 and bag hanging means 35 are mounted on these ends 34 for supporting the bags in the dotted line position so that the cotton which is picked from the plant and drawn into the tubes will be raised up the trough portions of the tubes and be delivered into the bags as will be quite apparent.

It is thought that the construction, operation and advantages of the invention will now be quite apparent to those skilled in this art without a more detailed description thereof.

The present embodiment of the invention has been disclosed in detail merely by way of example since in actual practice it attains the features of advantage enumerated as desirable in the statement of the invention and the above description.

It will be apparent that changes in the details of construction and in the combination and arrangement of parts may be resorted to without departing from the spirit or scope of the invention as hereinafter claimed or sacrificing any of its advantages.

Having thus described my invention, what I claim as new is:

1. In a cotton picking apparatus of the class described, a picker mechanism comprising a stationary coil, a rotatable coil in the stationary coil, said stationary coil having coil springs wrapped about the coils thereof, star wheels rotatable on the strand of the outer coil, and held in place by the coil springs, said star wheels having their teeth extending between the coils of the rotating coil to be actuated thereby.

2. In a cotton picking apparatus of the class described, a picker mechanism comprising a stationary coil, a rotatable coil in the stationary coil, said stationary coil having coil springs wrapped about the coils thereof, star wheels rotatable on the strand of the outer coil, and held in place by the coil springs, said star wheels having their teeth extending between the coils of the rotating coil to be actuated thereby, a casing having an opening with which the inner end of the stationary coil registers, and means extending through the opening for rotating the rotating coil.

3. In a cotton picking and harvesting machine of the class described, a casing having an opening, a coil extending from the casing registering with the opening, a second coil rotatable in the first coil, a bearing in the casing, an extension from the rotatable coil journaled in the bearing, means for rotating the extension, said casing having a trough like bottom, and a coil rotatable in said trough like bottom for ejecting cotton collected in the casing.

4. In a machine of the class described, a frame of arch like formation, a pair of casings fixed to the sides thereof and formed with inwardly extending lateral openings, pickers extending from the casing at the openings to deliver cotton into the casing through the openings, said casings having trough shaped bottoms, and coils operable in said trough shaped bottoms for conveying cotton up the casing.

5. In a machine of the class described, an elongated tube having a trough shaped bottom portion and a casing formed in the upper portion thereof, the casing in said upper portion having lateral openings, coils fixed to the casing in said upper portions and extending laterally therefrom in registry with the openings, rotatable coils in the first mentioned coils, coils extending longitudinally of and rotatable in the trough shaped bottom, means for rotating the second and third mentioned coils.

6. In a machine of the class described, an elongated tube having trough shaped bottom portions and a casing formed in the upper portion thereof, the casing in said upper portion having lateral openings, coils fixed to the casing in said upper portions and extending laterally therefrom in registry with the openings, rotatable coils in the first mentioned coils, coils extending longitudinally of and rotatable in the trough shaped bottom, means for rotating the second and third mentioned coils, the first mentioned coils having star wheels rotatably mounted thereon with their teeth extending between the coils of the second coil and being actuated thereby for rotating the star wheel.

7. In a machine of the class described, an elongated tube having trough shaped bottom portions and a casing formed in the upper portion thereof, the casing in said upper portion having lateral openings, coils fixed to the casing in said upper portions and extending laterally therefrom in registry with the openings, rotatable coils in the first mentioned coils, coils extending longitudinally of and rotatable in the trough shaped bottom, means for rotating the second and third mentioned coils, the first mentioned coils having star wheels rotatably mounted thereon with their teeth extending between the coils of the second coil and being actuated thereby for rotating the star wheel, coil springs wrapped about the strands on the first coil to fold the star wheels in place.

8. In a machine of the class described, an elongated tube having trough shaped bottom portions and a casing formed in the upper portion thereof, the casing in said upper portion having lateral openings, coils fixed to the casing in said upper portions and extending laterally therefrom in registry with the openings, rotatable coils in the first mentioned coils, coils extending longitudinally of and rotatable in the trough shaped bottom, means for rotating the second and third mentioned coils, the first mentioned coils having star wheels rotatably mounted thereon with their teeth extending between the coils of the second coil and being actuated thereby for rotating the star wheel, coil springs wrapped about the coils on the first coil to hold the star wheels in place, the outer end of the second coils terminating in yokes for receiving the outermost coil of the first mentioned coils being guided thereby.

In testimony whereof I affix my signature.

JOSEPH DARBONNE, Jr.